Sept. 2, 1941.  S. W. H. W. FALLOON ET AL  2,254,734
PHASE CHANGING ELECTRICAL CIRCUIT ARRANGEMENT
Filed Jan. 21, 1939

INVENTORS
SHIRLEY WALDRON HUGH WOLSELEY FALLOON
GEORGE MILLINGTON
BY H. S. Snover
ATTORNEY Patented Sept. 2, 1941

2,254,734

UNITED STATES PATENT OFFICE 2,254,734

PHASE CHANGING ELECTRICAL CIRCUIT ARRANGEMENT

Shirley Waldron Hugh Wolseley Falloon, Chelmsford, and George Millington, London, England, assignors to Radio Corporation of America, a corporation of Delaware Application January 21, 1939, Serial No. 252,154
In Great Britain January 22, 1938, 7 Claims.  (Cl. 178—44)

This invention relates to phase changing arrangements and has for its object to provide a variable phase changing arrangement which can be utilized to change the phase of an applied alternating E. M. F. by an amount which is accurately dependent upon the adjustment of the said arrangement. Such a variable, calibrated phase changer is of use for many purposes and in particular in those known radio signalling systems in which the directivity of an aerial system is varied in the vertical or in the horizontal plane by adjusting the phases of the currents in feeders to or from individual aerial units forming part of an aerial system.

According to this invention a variable phase changing arrangement comprises two mutually perpendicular inductance coils each forming part of a tuned circuit, said circuits being resonant at two frequencies on opposite sides of the frequency of the alternating current whose phase is to be adjusted said two frequencies being such that the phases of the currents in two said coils will be in phase quadrature if said circuits are energized by said alternating current; two further mutually perpendicular coils, said first mentioned two coils forming the stator (or the rotor) of a variable transformer and said further two coils forming the rotor (or the stator) of said variable transformer; means for applying said alternating current to the first mentioned two coils and means for taking off alternating current output from the further two coils the arrangement being such that the relative phase between the input and the output alternating currents depends upon the angle of the rotor relative to the stator. The effects of stray capacities must, of course, be taken into account and the above mentioned resonant circuits are to be taken as resonant to the frequencies stated when the apparatus is fully assembled and stray capacities are playing their parts.

Figure 1:
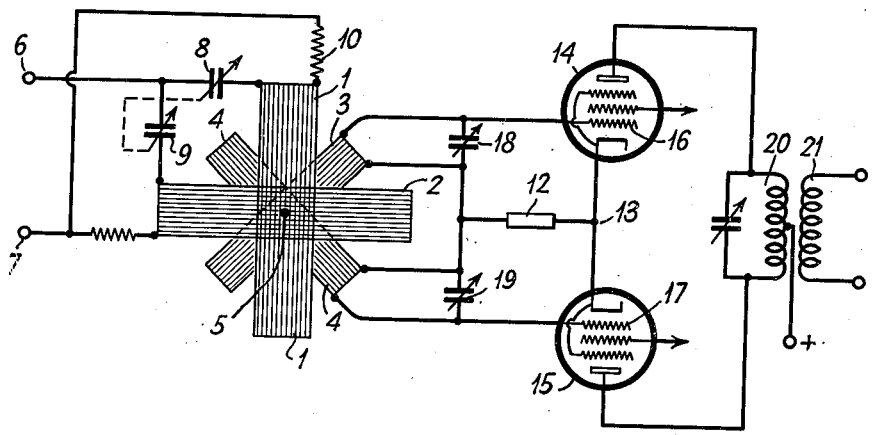
Figure 2:
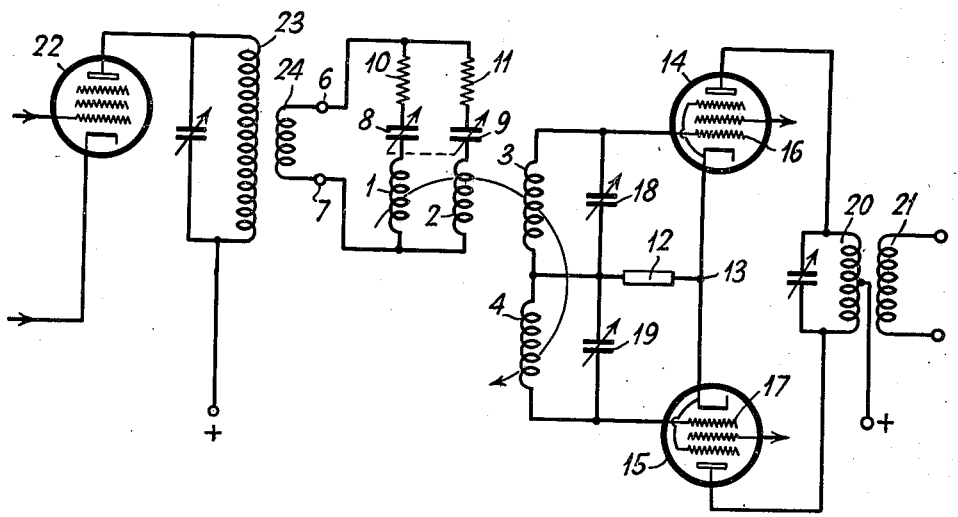

The invention is illustrated in the accompanying schematic and diagrammatic drawing, in which Figure 1 illustrates an embodiment of the invention and Figure 2 is a modification thereof.

Referring to Figure 1 which shows diagrammatically one way of carrying out this invention, there is provided a variable transformer comprising two mutually perpendicular stator coils 1, 2 and within said coils, two mutually perpendicular rotor coils 3, 4 the two rotor coils being rotatable together about an axis 5 which is diametrical to all four coils. The terminal 6 of a pair of input terminals 6, 7 is connected to one end of one stator coil 1 through a tuning condenser 8 and also to one end of the other stator coil 2 through a second tuning condenser 9. The other input terminal 7 is connected to the remaining ends of the two stator coils 1, 2 through two separate resistances 10, 11. The tuning condenser 8, 9 may be variable and, if so, may be gang controlled if desired. Thus each stator coil forms part of a tuned circuit, the circuits being resonant respectively at frequencies $F+f'$ and $F-f''$ where F is the frequency of the current whose phase is to be shifted and $f'$ and $f''$ are frequencies such that, if both tuned circuits are fed with the frequency F the currents in the two stator coils will be in phase quadrature and of equal amplitude. The two rotor coils 3, 4 are connected together at one end, the junction point being connected (through a suitable bias source 12 if required) to the common cathode point 13 of two push-pull connected valves 14, 15 (shown as pentodes, but, of course, other suitable valves might be used) whose input grids 16, 17 are connected one to the free end of one rotor coil 3 and the other to the free end of the other rotor coil 4. Each rotor coil is tuned by a condenser 18 or 19. Phase shifted output is taken via tuned circuit 20 and output coil 21 from the push-pull anode circuit of the two valves 14, 15.

With this arrangement the phase relation between the input and output currents will depend upon and be accurately proportional to the angular setting of the variable transformer and it may be shown that, by reason of the use of the two similar mutually perpendicular rotor coils, the absorption of energy by the rotor circuit will not disturb the quadrature relationship between the currents in the stator coils, for, so long as the variable transformer is wound to obey the usual law "coupling=K sin $\theta$" (where K is a constant and $\theta$ is the angle of rotary displacement of the rotor with respect to the stator) the total amount of energy absorbed by the rotor circuit from the stator circuit will not vary with rotation of the rotor.

Obviously, if desired, the functions of the rotor and stator can be interchanged, i. e. input may be applied to the rotor and output taken from the stator.

Where a phase changer is required between successive stages of valve amplification the input alternating potential may be applied in push-pull to the grids of two valves constituting one stage, each valve anode circuit containing one or other of the two stator coils 1, 2 of a variable transformer as above described, each said stator coil being in parallel with a series connected combination of resistance and tuning condenser (8, 10 or 9, 11). The rest of the circuit is as before, the second valve stage being constituted by the two push-pull valves 14, 15 above described as connected to the rotor coils (3, 4). This arrangement allows of easy correct matching of the amplifier valves. Alternatively, and as shown in Figure 2, the input alternating potential may be applied in the grid circuit of a valve 22 whose anode circuit contains the primary 23 of a tuned transformer 23, 24 the secondary 24 feeding into the stators of the variable transformer. The ratio of the transformer should be such as to provide a satisfactory impedance match between the valve 22 and the load constituted by the series tuned stator circuits in parallel. Corresponding parts in Figures 1 and 2 are given the same references, the phase changer being shown purely diagrammatically in Figure 2.

Having now particularly described and ascertained the nature of our said invention and in what manner the same is to be performed, we declare that what we claim is:

1. A variable phase changing arrangement comprising a pair of inductance coils having a common diameter and disposed at an angle to each other, and forming the stator of a variable transformer, each coil forming part of a tuned circuit, said circuits being so dimensioned that the phase angle between the currents therein when energized by alternating current is equal to the angle between said coils, a second pair of mutually perpendicular coils forming the rotor of said variable transformer, means for applying alternating current to said first mentioned pair of coils, a balanced output circuit, one end of each of said second pair of coils being connected together and to a neutral point in said output circuit, the other ends of said second pair of coils being connected to points on said output circuit which are adapted to oppositely vary in potential with respect to said neutral point, the relative phase relationship between the input and output alternating currents depending upon the angle of the rotor relative to the stator.

2. A variable phase changing arrangement comprising a pair of inductance coils having a common diameter and disposed at an angle to each other, and forming the stator of a variable transformer, each coil forming part of a tuned circuit, said circuits being so dimensioned that the phase angle between the currents therein when energized by alternating current is equal to the angle between said coils whereby a rotating electromagnetic field is formed, a second pair of mutually perpendicular coils forming the rotor of said variable transformer, means for applying alternating current to said first mentioned pair of coils, a balanced output circuit, one end of each of said second pair of coils being connected together and to a neutral point in said output circuit, the other ends of said second pair of coils being connected to points on said output circuit which are adapted to oppositely vary in potential with respect to said neutral point, the relative phase relationship between the input and output alternating currents depending upon the angle of the rotor relative to the stator.

3. A variable phase changing arrangement comprising two mutually perpendicular inductance coils each forming part of a tuned circuit, said circuits being resonant at two frequencies on opposite sides of the frequency of the alternating current whose phase is to be adjusted, said two frequencies being such that the phases of the currents in two said coils will be in phase quadrature when said circuits are energized by said alternating current; two further mutually perpendicular coils, said first mentioned two coils forming the stator of a variable transformer and said further two coils forming the rotor of said variable transformer; means for applying said alternating current to the first mentioned two coils and, a balanced output circuit, one end of each of said further pair of coils being connected together and to a neutral point in said output circuit, the other ends of said further pair of coils being connected to points on said output circuit which are adapted to oppositely vary in potential with respect to said neutral point, the arrangement being such that the relative phase between the input and the output alternating currents depends upon the angle of the rotor relative to the stator.

4. A variable phase changing arrangement comprising two mutually perpendicular inductance coils each forming part of a tuned circuit, said circuits being resonant at two frequencies on opposite sides of the frequency of the alternating current whose phase is to be adjusted, said two frequencies being such that the phases of the currents in two said coils will be in phase quadrature when said circuits are energized by said alternating current; two further mutually perpendicular coils, said first mentioned two coils forming the rotor of a variable transformer and said further two coils forming the stator of said variable transformer; means for applying said alternating current to the first mentioned two coils and, a balanced output circuit, one end of each of said further pair of coils being connected together and to a neutral point in said output circuit, the other ends of said further pair of coils being connected to points on said output circuit which are adapted to oppositely vary in potential with respect to said neutral point, the arrangement being such that the relative phase between the input and the output alternating currents depends upon the angle of the rotor relative to the stator.

5. For use in a phase changing arrangement as claimed in claim 2 a variable transformer comprising two mutually perpendicular similar coils fixed in relation to one another and having a common diameter and two further mutually perpendicular similar coils also with a common diameter and fixed in relation to one another within the first mentioned perpendicular coils, the further coils being rotatable together with respect to the first mentioned coils about an axis which is diametrical to all four coils.

6. An arrangement as claimed in claim 2 wherein each of the two coils to which the alternating current whose phase is to be adjusted is applied, is in parallel with a circuit comprising a resistance in series with a tuning condenser.

7. An arrangement as claim 2 wherein each of the two coils to which the alternating current whose phase is to be adjusted is applied, is in parallel with a circuit comprising a resistance in series with a tuning condenser, said tuning condensers being simultaneously variable.

SHIRLEY WALDRON HUGH
WOLSELEY FALLOON.
GEORGE MILLINGTON.